(12) United States Patent
Okada et al.

(10) Patent No.: US 6,884,862 B2
(45) Date of Patent: Apr. 26, 2005

(54) POLYMER, PROCESS FOR PRODUCTION, COMPOSITION FOR FILM FORMATION CONTAINING THE SAME, METHOD OF FILM FORMATION, AND INSULATING FILM

(75) Inventors: Takashi Okada, Ibaraki (JP); Noriyasu Sinohara, Ibaraki (JP); Kaori Shirato, Ibaraki (JP); Masahiko Ebisawa, Ibaraki (JP); Michinori Nishikawa, Ibaraki (JP); Kinji Yamada, Ibaraki (JP)

(73) Assignee: JSR Corporation, Tokyo (JP)

( * ) Notice: Subject to any disclaimer, the term of this patent is extended or adjusted under 35 U.S.C. 154(b) by 274 days.

(21) Appl. No.: 10/128,411

(22) Filed: Apr. 24, 2002

(65) Prior Publication Data

US 2002/0161173 A1 Oct. 31, 2002

(30) Foreign Application Priority Data

Apr. 27, 2001 (JP) ........................................ 2001-131385

(51) Int. Cl.[7] .............................................. C08F 38/00
(52) U.S. Cl. ...................................... 526/285; 428/500
(58) Field of Search .......................... 526/285; 428/500, 428/411.1

(56) References Cited

U.S. PATENT DOCUMENTS

| | | | |
|---|---|---|---|
| 3,300,456 A | | 1/1967 | Hay |
| 5,644,013 A | * | 7/1997 | Yuan et al. .................... 528/15 |
| 6,528,605 B1 | * | 3/2003 | Akiike et al. ................ 526/285 |
| 2002/0172652 A1 | * | 11/2002 | Shinohara et al. ....... 424/70.12 |

FOREIGN PATENT DOCUMENTS

EP 1 099 719 5/2001

OTHER PUBLICATIONS

D. L. Trumbo, et al., Journal of Polymer Science: Part A: Polymer Chemistry, vol. 24, XP–002161118, pp. 2311–2326, "Polymerization Using Palladium (II) Salts: Homopolymers and Copolymers From Phenylethynyl Compounds and Aromatic Bromides", 1986.

L. Kloppenburg, et al., J. Am. Chem. Soc., vol. 120, no. 31, XP–002208531, pp. 7973–7974, "Alkyne Metathesis With Simple Catalyst Systems: Poly($_p$–Phenyleneethynylene)S", Jul. 23, 1998.

V. Francke, et al., Macromolecules, vol. 31, no. 8, XP–002208532, pp. 2447–2453, "Synthesis of a, ω–Difunctionalized Oligo– and Poly($_p$–Phenyleneethynylene)S", 1998.

H. Haeger, et al., Macromolecular Chemistry and Physics, vol. 199, no. 9, XP–00785723, pp. 1821–1826, "Synthesis of Poly(Phenyleneethynylene) Without Diine Defects", Sep. 1, 1998.

\* cited by examiner

Primary Examiner—James J. Seidleck
Assistant Examiner—Melanie Bissett
(74) Attorney, Agent, or Firm—Oblon, Spivak, McClelland, Maier & Neustadt, P.C.

(57) ABSTRACT a composition for film formation which can be cured in a short time period and give a film having a low dielectric constant and excellent in heat resistance, adhesion and cracking resistance, a polymer for use in the composition and a process for producing the polymer. The composition prepared by dissolving the polymer having specific repeating units in a solvent has excellent film-forming properties. The polymer has repeating units represented by the following general formula (1):

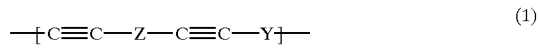

wherein Z and Y are as defined hereinabove.

19 Claims, 2 Drawing Sheets

POLYMER, PROCESS FOR PRODUCTION, COMPOSITION FOR FILM FORMATION CONTAINING THE SAME, METHOD OF FILM FORMATION, AND INSULATING FILM

FIELD OF THE INVENTION

The present invention relates to a polymer suitable for forming a film useful as an interlayer insulating film in, e.g., semiconductor devices. The invention further relates to a process for producing the polymer and a composition for film formation containing the same.

DESCRIPTION OF THE RELATED ART

In the field of electronic materials, the recent progress toward a higher degree of integration, larger number of functions, and higher performances has resulted in increased circuit resistance and increased capacitance between wirings and this in turn has resulted in increases not only in power consumption but in delay time. The increase in delay time is a major factor contributing to a decrease in signal transfer speed in devices and to cross talks. Because of this, it is desired to reduce parasitic resistance or parasitic capacitance. One measure which is being taken in reducing the parasitic capacitance so as to cope with higher speed device operation is to coat the periphery of a wiring with a low dielectric constant interlayer insulating film. For use in LCDs (liquid crystal displays) and related products, such insulating films are required to have transparency besides low dielectric constant characteristics.

Polyimides are widely known as a heat-resistant organic material which meets those requirements. However, since polyimides contain imide groups, which are highly polar, they not only are insufficient in dielectric characteristics and water absorption properties but have a problem that they have a color. No satisfactory polyimides have been obtained. Furthermore, for curing polyimides, it is necessary to conduct curing at 350 to 400° C. for as long as about 1 hour.

On the other hand, polyphenylenes are known as an organic material having high heat resistance and containing no polar groups. Since these polyphenylenes have poor solubility in organic solvents although excellent in heat resistance, soluble groups are generally incorporated into side chains of a polyphenylene to enhance solubility in solvents. Examples of such polyphenylenes include the polymers disclosed in U.S. Pat. No. 5,214,044, WO 96/28491, and EP 629217.

These polymers basically have a poly-p-phenylene structure as the main structure. Although the structural units of the polymers are partly derived from a flexible monomer used as a comonomer, the polymers are soluble only in specific organic solvents and have a problem that solutions thereof in solvents have a high viscosity due to the stiffness of the molecules. Those polyphenylenes have hence been unsatisfactory in processability.

Investigations have been made on the crosslinking of a polyphenylene polymer for the purposes of impartation of solvent resistance, improvement of heat resistance and mechanical properties, etc. Although the technique of crosslinking with acetylene bonds is known, it has a problem concerning coating film adhesion.

Furthermore, a technique for enhancing the processability and solubility of a polyarylene by incorporating ether groups into the polymer has been investigated. However, the polymer thus obtained has insufficient heat resistance.

SUMMARY OF THE INVENTION

An object of the invention, which has been achieved under the circumstances described above, is to provide a composition for film formation which can be cured in a short time period and give a film having a low dielectric constant and excellent in heat resistance, adhesion, and cracking resistance. Another object of the invention is to provide a polymer for use in the composition. Still another object of the invention is to provide a process for producing the polymer.

The present inventors made intensive investigations in order to eliminate the problems described above. As a result, it has been found that a composition prepared by dissolving a polymer having specific repeating units in a solvent has excellent film-forming properties and is free from those problems. The invention has been achieved based on this finding.

The invention first provides a polymer having repeating units represented by the following general formula (1):

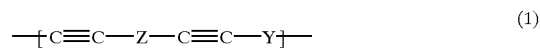

(1)

wherein Z is at least one bivalent aromatic group selected from the group consisting of bivalent aromatic groups represented by the following general formulae (2) and (3):

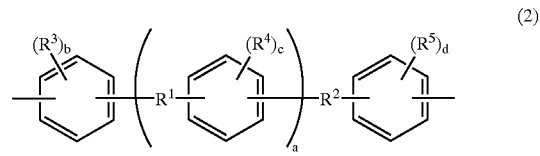

(2)

(3)

wherein $R^1$ and $R^2$ each independently represent a single bond, —O—, —CO—, —CH$_2$—, —COO—, —CONH—, —S—, —SO$_2$—, a phenylene group, a fluorenylene group, or a bivalent group represented by the formula

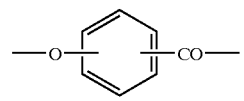

$R^3$, $R^4$, $R^5$ and $R^6$ each independently represent a hydrocarbon group having 1 to 20 carbon atoms, a cyano group, a nitro group, an alkoxyl group having 1 to 20 carbon atoms, or an aryl group; a is an integer of 1 to 3; and b, c, d, and e each independently are an integer of 0 to 4, and Y is at least one bivalent aromatic group selected from the group consisting of bivalent aromatic groups represented by the following general formulae (4) and (5):

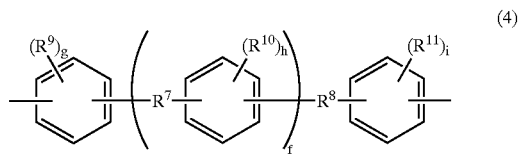

(4)

-continued (5)

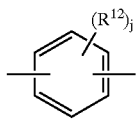

wherein $R^7$ and $R^8$ each independently represent a single bond, —O—, —CO—, —CH$_2$—, —COO—, —CONH—, —S—, —SO$_2$—, a phenylene group, or a fluorenylene group; $R^9$, $R^{10}$, $R^{11}$, and $R^{12}$ each independently represent a hydrocarbon group having 1 to 20 carbon atoms, a cyano group, a nitro group, an alkoxyl group having 1 to 20 carbon atoms, or an aryl group; f is an integer of 0 to 3; and g, h, i, and j each independently are an integer of 0 to 4.

The invention secondly provides a process for producing the polymer which comprises polymerizing at least one compound of the following formula (6):

(6)

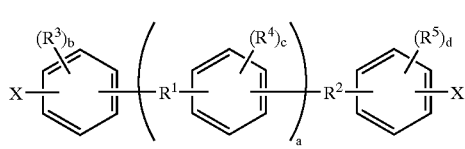

wherein $R^1$, $R^2$, $R^3$, $R^4$ and $R^5$, a, b, c and d, are the same as defined above with regard to formula (1); and X represents a halogen atom
and at least one compound selected from the group consisting of compounds represented by the following formulae (8) and (9):

(8)

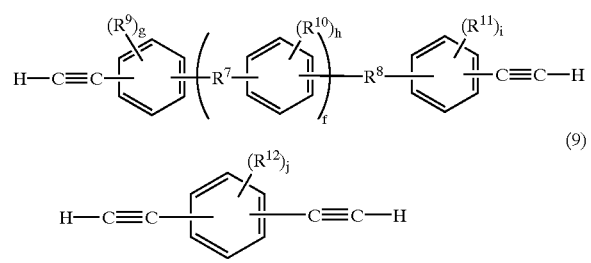

(9)

wherein $R^7$ and $R^8$ each independently represent a single bond, —O—, —CO—, —CH$_2$—, —COO—, —CONH—, —S—, —SO$_2$—, a phenylene group, or a fluorenylene group; $R^9$, $R^{10}$, $R^{11}$, and $R^{12}$ each independently represent a hydrocarbon group having 1 to 20 carbon atoms, a cyano group, a nitro group, an alkoxyl group having 1 to 20 carbon atoms, or an aryl group; f is an integer of 0 to 3; and g, h, i, and j each independently are an integer of 0 to 4, in the presence of a catalyst.

The invention thirdly provides a composition for film formation containing the polymer.

BRIEF DESCRIPTION OF THE DRAWINGS

The foregoing and other aims and advantages of the invention will be apparent from the following detailed description and the accompanying drawings, in which.

DETAILED DESCRIPTION OF THE INVENTION

Polymer

Figure 1:
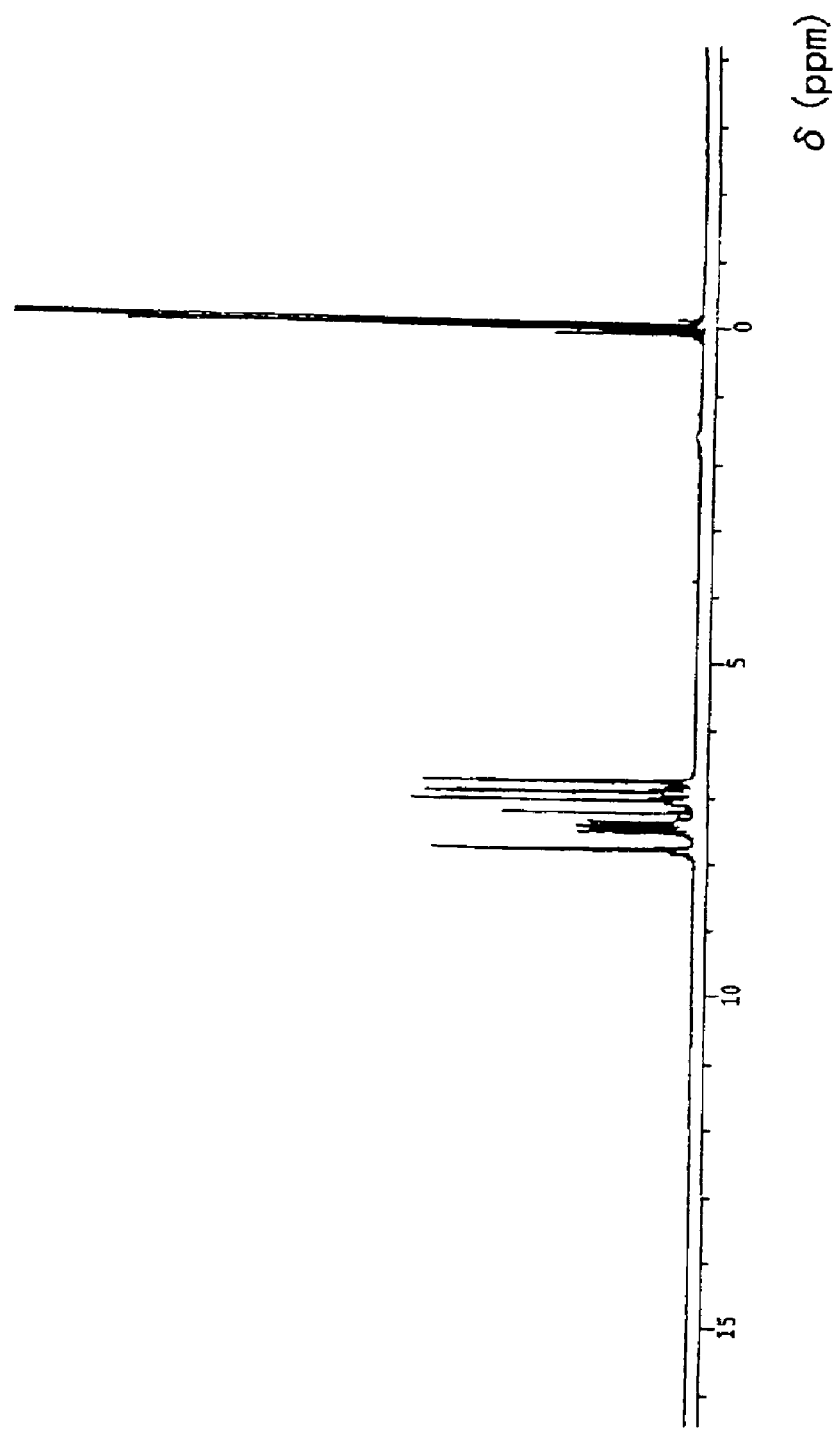
FIG. 1 is a presentation showing a $^1$H-NMR spectrum of the polymer obtained in Example 2.

The polymer of the invention is a polymer having repeating units represented by the following general formula (1).

(1)

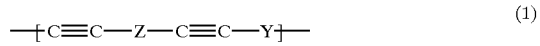

In general formula (1), Z is at least one bivalent aromatic group selected from the group consisting of bivalent aromatic groups represented by the following general formulae (2) and (3):

(2)

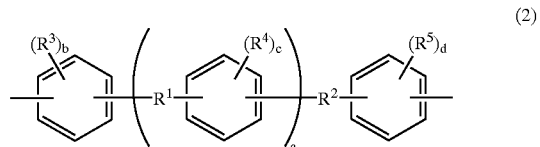

(3)

wherein $R^1$ and $R^2$ each independently represent a single bond, —O—, —CO—, —CH$_2$—, —COO—, —CONH—, —S—, —SO$_2$—, a phenylene group, a fluorenylene group, or a bivalent group represented by the formula

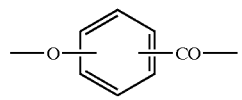

$R^3$, $R^4$, $R^5$, and $R^6$ each independently represent a hydrocarbon group having 1 to 20 carbon atoms, a cyano group, a nitro group, an alkoxyl group having 1 to 20 carbon atoms, or an aryl group; a is an integer of 1 to 3; and b, c, d, and e each independently are an integer of 0 to 4, and Y is at least one bivalent aromatic group selected from the group consisting of bivalent aromatic groups represented by the following general formulae (4) and (5):

(4)

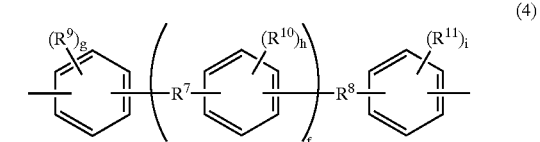

(5)

wherein $R^7$ and $R^8$ each independently represent a single bond, —O—, —CO—, —CH$_2$—, —COO—, —CONH—, —S—, —SO$_2$—, a phenylene group, or a fluorenylene group; $R^9$, $R^{10}$, $R^{11}$, and $R^{12}$ each independently represent a hydrocarbon group having 1 to 20 carbon atoms, a cyano group, a nitro group, an alkoxyl group having 1 to 20 carbon atoms, or an aryl group; f is an integer of 0 to 3; and g, h, i, and j each independently are an integer of 0 to 4.

The polymer described above is preferably one having —O— or —CO— in the polymer skeleton.

Production of the Polymer

This polymer can be produced by polymerizing at least one compound of the following formula (6):

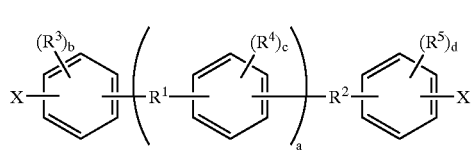 (6)

wherein $R^1$, $R^2$, $R^3$, $R^4$ and $R^5$, a, b, c and d are the same as defined above with regard to formula (1); and X represents a halogen atom and at least one compound selected from the group consisting of compounds represented by the following formulae (8) and (9):

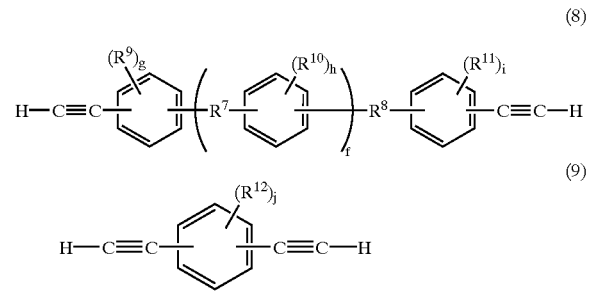

wherein $R^7$ and $R^8$ each independently represent a single bond, —O—, —CO—, —CH$_2$—, —COO—, —CONH—, —S—, —SO$_2$—, a phenylene group, or a fluorenylene group; $R^9$, $R^{10}$, $R^{11}$, and $R^{12}$ each independently represent a hydrocarbon group having 1 to 20 carbon atoms, a cyano group, a nitro group, an alkoxyl group having 1 to 20 carbon atoms, or an aryl group; f is an integer of 0 to 3; and g, h, i, and j each independently are an integer of 0 to 4, in the presence of a catalyst.

Examples of the compounds represented by general formula (6) include 1,2-bis(2-bromophenoxy)benzene, 1,2-bis(2-iodophenoxy)benzene, 1,2-bis(3-bromophenoxy)benzene, 1,2-bis(3-iodophenoxy)benzene, 1,2-bis(4-bromophenoxy)benzene, 1,2-bis(4-iodophenoxy)benzene, 1,3-bis(2-bromophenoxy)benzene, 1,3-bis(2-iodophenoxy)benzene, 1,3-bis(3-bromophenoxy)benzene, 1,3-bis(3-iodophenoxy)benzene, 1,3-bis(4-bromophenoxy)benzene, 1,3-bis(4-iodophenoxy)benzene, 1,4-bis(3-bromophenoxy)benzene, 1,4-bis(3-iodophenoxy)benzene, 1,4-bis(2-bromophenoxy)benzene, 1,4-bis(2-iodophenoxy)benzene, 1,4-bis(4-bromophenoxy)benzene, 1,4-bis(4-iodophenoxy)benzene, 1-(2-bromobenzoyl)-3-(2-bromophenoxy)benzene, 1-(2-iodobenzoyl)-3-(2-iodophenoxy)benzene, 1-(3-bromobenzoyl)-3-(3-bromophenoxy)benzene, 1-(3-iodobenzoyl)-3-(3-iodophenoxy)benzene, 1-(4-bromobenzoyl)-3-(4-bromophenoxy)benzene, 1-(4-iodobenzoyl)-3-(4-iodophenoxy)benzene, 1-(3-bromobenzoyl)-4-(3-bromophenoxy)benzene, 1-(3-iodobenzoyl)-4-(3-iodophenoxy)benzene, 1-(4-bromobenzoyl)-4-(4-bromophenoxy)benzene, 1-(4-iodobenzoyl)-4-(4-iodophenoxy)benzene, 2,2'-bis(2-bromophenoxy)benzophenone, 2,2'-bis(2-iodophenoxy)benzophenone, 2,4'-bis(2-bromphenoxy)benzophenone, 2,4'-bis(2-iodophenoxy)benzophenone, 4,4'-bis(2-bromophenoxy)benzophenone, 4,4'-bis(2-iodophenoxy)benzophenone, 2,2'-bis(3-bromophenoxy)benzophenone, 2,2'-bis(3-iodophenoxy)benzophenone, 2,4'-bis(3-bromophenoxy)benzophenone, 2,4'-bis(3-iodophenoxy) benzophenone, 4,4'-bis(3-bromophenoxy)benzophenone, 4,4'-bis(3-iodophenoxy)benzophenone, 2,2'-bis(4-bromophenoxy)benzophenone, 2,2'-bis(4-iodophenoxy) benzophenone, 2,4'-bis(4-bromophenoxy)benzophenone, 2,4'-bis(4-iodophenoxy)benzophenone, 4,4'-bis(4-bromophenoxy)benzophenone, 4,4'-bis(4-iodophenoxy) benzophenone, 2,2'-bis(2-bromobenzoyl)benzophenone, 2,2'-bis(2-iodobenzoyl)benzophenone, 2,4'-bis(2-bromobenzoyl)benzophenone, 2,4'-bis(2-iodobenzoyl) benzophenone, 4,4'-bis(2-bromobenzoyl)benzophenone, 4,4'-bis(2-iodobenzoyl)benzophenone, 2,2'-bis(3-bromobenzoyl)benzophenone, 2,2'-bis(3-iodobenzoyl) benzophenone, 2,4'-bis(3-bromobenzoyl)benzophenone, 2,4'-bis(3-iodobenzoyl)benzophenone, 4,4'-bis(3-bromobenzoyl)benzophenone, 4,4'-bis(3-iodobenzoyl) benzophenone, 2,2'-bis(4-bromobenzoyl)benzophenone, 2,2'-bis(4-iodobenzoyl)benzophenone, 2,4'-bis(4-bromobenzoyl)benzophenone, 2,4'-bis(4-iodobenzoyl) benzophenone, 4,4'-bis(4-bromobenzoyl)benzophenone, 4,4'-bis(4-iodobenzoyl)benzophenone, 3,4'-bis(2-bromophenoxy)diphenyl ether, 3,4'-bis(2-iodophenoxy) diphenyl ether, 3,4'-bis(3-bromophenoxy)diphenyl ether, 3,4'-bis(3-iodophenoxy)diphenyl ether, 3,4'-bis(4-bromophenoxy)diphenyl ether, 3,4'-bis(4-iodophenoxy) diphenyl ether, 4,4'-bis(2-bromophenoxy)diphenyl ether, 4,4'-bis(2-iodophenoxy)diphenyl ether, 4,4'-bis(3-bromophenoxy)diphenyl ether, 4,4'-bis(3-iodophenoxy) diphenyl ether, 4,4'-bis(4-bromophenoxy)diphenyl ether, 4,4'-bis(4-iodophenoxy)diphenyl ether, 3,4'-bis(2-bromobenzoyl)diphenyl ether, 3,4'-bis(2-iodobenzoyl) diphenyl ether, 3,4'-bis(3-bromobenzoyl)diphenyl ether, 3,4'-bis(3-iodobenzoyl)diphenyl ether, 3,4'-bis(4-bromobenzoyl)diphenyl ether, 3,4'-bis(4-iodobenzoyl) diphenyl ether, 4,4'-bis(2-bromobenzoyl)diphenyl ether, 4,4'-bis(2-iodobenzoyl)diphenyl ether, 4,4'-bis(3-bromobenzoyl)diphenyl ether, 4,4'-bis(3-iodobenzoyl) diphenyl ether, 4,4'-bis(4-bromobenzoyl)diphenyl ether, and 4,4'-bis(4-iodobenzoyl)diphenyl ether. These compounds may be used alone or in combination of two or more thereof.

Examples of the compounds represented by general formula (8) include 4,4'-diethynylbiphenyl, 3,3'-diethynylbiphenyl, 3,4'-diethynylbiphenyl, 4,4'-diethynyldiphenyl ether, 3,3'-diethynyldiphenyl ether, 3,4'-diethynyldiphenyl ether, 4,4'-diethynylbenzophenone, 3,3'-diethynylbenzophenone, 3,4'-diethynylbenzophenone, 4,4'-diethynyldiphenylmethane, 3,3'-diethynyldiphenylmethane, 3,4'-diethynyldiphenylmethane, phenyl 4,4'-diethynylbenzoate, phenyl 3,3'-diethynylbenzoate, phenyl 3,4'-diethynylbenzoate, 4,4'-diethynylbenzanilide, 3,3'-diethynylbenzanilide, 3,4'-diethynylbenzanilide, 4,4'-diethynyldiphenyl sulfide, 3,3'-diethynyldiphenyl sulfide, 3,4'-diethynyldiphenyl sulfide, 4,4'-diethynyldiphenyl sulfone, 3,3'-diethynyldiphenyl sulfone, 3,4'-diethynyldiphenyl sulfone, 2,4,4'-triethynyldiphenyl ether, 9,9-bis(4-ethynylphenyl)fluorene, 4,4''-diethynyl-p-terphenyl, 4,4''-diethynyl-m-terphenyl, and 4,4''-diethynyl-o-terphenyl. These compounds may be used alone or in combination of two or more thereof.

Examples of the compounds represented by general formula (9) include 1,2-diethynylbenzene, 1,3-diethynylbenzene, 1,4-diethynylbenzene, 2,5-diethynyltoluene, and 3,4-diethynyltoluene. These compounds may be used alone or in combination of two or more thereof.

The polymer of the invention is obtained by polymerizing at least one compound of formula (6) with at least one compound selected from the group consisting of compounds represented by general formulae (8) and (9) in the presence of a catalyst. In this polymerization, the compound represented by general formula (6) and the compound(s) represented by general formula (8) and/or general formula (9) are used in such a proportion that the total amount of the latter compound(s) is generally from 0.8 to 1.2 mol, preferably from 0.9 to 1.1 mol, more preferably from 0.95 to 1.05 mol, per mol of all the former compound(s). In the case where the total amount of the latter compound(s) is less than 0.8 mol or exceeds 1.2 mol, the polymer yielded is less apt to have a high molecular weight.

In the process of the invention, those compounds are polymerized preferably in the presence of a catalyst comprising a transition metal compound, more preferably in the presence of a catalyst comprising a transition metal compound and a basic compound. An especially preferred catalyst is constituted of the following ingredients (a), (b), and (c):

(a) a combination of a palladium salt or palladium and a substance which is capable of bonding thereto as a ligand or of supplying a radical (a group of atoms) bonding thereto as a ligand to thereby form a complex (including complex ions) (hereinafter referred to as a ligand former); or a palladium complex (optionally used in combination with a ligand former);

(b) a compound of univalent copper;

(c) a basic compound.

Examples of the palladium salt include palladium chloride, palladium bromide, and palladium iodide. Examples of the ligand former include triphenylphosphine, tri-o-tolylphosphine, tricyanophenylphosphine, and tricyanomethylphosphine. Of these, triphenylphosphine is preferred. These compounds may be used alone or in combination of two or more thereof.

Examples of the palladium complex include dichlorobis(tripbenylphosphine)palladium, dibromobis(triphenylphospbine)palladium, diiodobis(triphenylpbospbine)palladium, dichlorobis(tri-o-tolylphosphine)palladium, dichlorobis(tricyanophenylphosphine)palladium, dichlorobis(tricyanomethylphosphine)palladium, dibromobis(tri-o-tolylphospbine)palladium, dibromobis(tricyanophenylphosphine)palladium, dibromobis(tricyanomethylphosphine)palladium, diiodobis(tri-o-tolylphosphine)palladium, diiodobis(tricyanophenylphosphine)palladium, diiodobis(tricyanomethylphosphine)palladium, tetrakis(triphenylphosphine)palladium, tetrakis(tri-o-tolylphosphine)palladium, tetrakis(tricyanophenylphosphine)palladium, and tetrakis(tricyanomethylphosphine)palladium. Preferred of these are dichlorobis(triphenylphosphine)palladium and tetrakis(triphenylphosphine)palladium. These compounds may be used alone or in combination of two or more thereof.

Examples of the compound of univalent copper include copper(I) chloride, copper(I) bromide, and copper(I) iodide. Those compounds may be used alone or in combination of two or more thereof.

The catalyst components described above are used in the following proportions.

The proportion of the palladium salt to be used is preferably from 0.0001 to 10 mol, more preferably from 0.001 to 1 mol, per mol of all the compounds represented by general formulae (6), (8) and (9). When the proportion thereof is smaller than 0.0001 mol, there are cases where the polymerization does not proceed sufficiently. On the other hand, proportions thereof exceeding 10 mol may result in difficulties in purification.

The proportion of the ligand former to be used is preferably from 0.0004 to 50 mol, more preferably from 0.004 to 5 mol, per mol of all the compounds represented by general formulae (6), (8) and (9). When the proportion thereof is smaller than 0.0004 mol, there are cases where the polymerization does not proceed sufficiently. On the other hand, proportions thereof exceeding 50 mol may result in difficulties in purification.

The proportion of the palladium complex to be used is preferably from 0.0001 to 10 mol, more preferably from 0.001 to 1 mol, per mol of all the compounds represented by general formulae (6), (8) and (9). When the proportion thereof is smaller than 0.0001 mol, there are cases where the polymerization does not proceed sufficiently. On the other hand, proportions thereof exceeding 10 mol may result in difficulties in purification.

The proportion of the compound of univalent copper to be used is preferably from 0.0001 to 10 mol, more preferably from 0.001 to 1 mol, per mol of all the compounds represented by general formulae (6), (8) and (9). When the proportion thereof is smaller than 0.0001 mol, there are cases where the polymerization does not proceed sufficiently. On the other hand, proportions thereof exceeding 10 mol may result in difficulties in purification.

On the other hand, examples of the basic compound include pyridine, pyrrole, piperazine, pyrrolidine, piperidine, picoline, trimethylamine, triethylamine, monoethanolamine, diethanolamine, dimethylmonoethanolamine, monomethyldiethanolamine, triethanolamine, diazabicyclooctane, diazabicyclononane, diazabicycloundecene, tetramethylammonium hydroxide, diethylamine, ammonia, n-butylamine, and imidazole. Preferred of these are diethylamine, piperidine, and n-butylamine. These compounds may be used alone or in combination of two or more thereof.

The proportion of the basic compound to be used is preferably from 1 to 1,000 mol, more preferably from 1 to 100 mol, per mol of all the compounds represented by general formulae (6) to (9). When the proportion thereof is smaller than 1 mol, there are cases where the polymerization does not proceed sufficiently. On the other hand, proportions thereof exceeding 100 mol are uneconomical.

In the process of the invention, a solvent can be used according to need. The polymerization solvent is not particularly limited. Examples thereof include halogenated solvents such as chloroform, dichloromethane, 1,2-dichloroethane, chlorobenzene, and dichlorobenzene; aromatic hydrocarbon solvents such as benzene, toluene, xylene, mesitylene, and diethylbenzene; ether solvents such as diethyl ether, tetrahydrofuran, dioxane, diglyme, anisole, diethylene glycol dimethyl ether, diethylene glycol diethyl ether, and diethylene glycol methyl ethyl ether; ketone solvents such as acetone, methyl ethyl ketone, 2-heptanone, cyclohexanone, and cyclopentanone; ester solvents such as methyl acetate, ethyl acetate, propyl acetate, butyl acetate, methyl lactate, ethyl lactate, butyl lactate, and γ-butyrolactone; and amide solvents such as N,N-dimethylformamide, N,N-dimethylacetamide, and N-methyl-2-pyrrolidone. It is preferred to sufficiently dry and deoxidize these solvents before use. These compounds may be used alone or in combination of two or more thereof.

The concentration of the monomers (polymerizable ingredients) in the polymerization solvent is preferably from 1 to 80% by weight, more preferably from 5 to 60% by weight.

The polymerization is conducted at a temperature of preferably from 0 to 150° C., more preferably from 5 to 100°

C., for a period of preferably from 0.5 to 100 hours, more preferably from 1 to 40 hours.

In the invention, the polymer obtained is preferably treated with a formate formed from formic acid and a basic compound. This treatment is more preferably conducted in a solvent.

The amount of the formate to be used is preferably from 0.01 to 100 parts by weight, more preferably from 0.1 to 20 parts by weight, per 100 parts by weight of the polymer. When the amount of the formate is smaller than 0.01 mol, there are cases where the purification is insufficient. On the other hand, amounts thereof exceeding 100 parts by weight pose problems that the aromatic compound becomes insoluble and the treatment is uneconomical.

The basic compound for forming a formate is not particularly limited. Examples thereof include pyridine, pyrrole, piperazine, pyrrolidine, piperidine, picoline, trimethylamine, triethylamine, monoethanolamine, diethanolamine, dimethylmonoethanolamine, monomethyldiethanolamine, triethanolamine, diazabicyclooctane, diazabicyclononane, diazabicycloundecene, tetramethylammonium hydroxide, diethylamine, ammonia, n-butylamine, and imidazole. Preferred of these are diethylamine, n-butylamine, and diazabicycloundecene. These compounds may be used alone or in combination of two or more thereof.

The amount of the basic compound to be used is preferably from 0.1 to 10 mol, more preferably from 0.5 to 5 mol, per mol of the formic acid. When the amount of the basic compound is less than 0.1 mol, there are cases where the aromatic compound undergoes a side reaction. On the other hand, amounts thereof exceeding 10 mol pose problems that the aromatic compound becomes insoluble and the formate preparation is uneconomical.

A formate which has been prepared beforehand may be added to an aromatic compound. Alternatively, use may be made of a method in which formic acid and a basic compound are added to an aromatic compound to prepare a formate in the reaction system.

The sequence of addition of formic acid and a basic compound is not particularly limited, and either of these may be added first. However, it is preferred to add a basic compound to the reaction system before formic acid is added thereto. When formic acid is added first and a basic compound is added thereafter, there are cases where heat generation by salt formation occurs in the presence of excess formic acid in the system and, hence, a side reaction proceeds.

In treating the polymer of the invention, it is preferred to prepare a polymer solution having a concentration of from 0.1 to 80% by weight, preferably from 1 to 50% by weight, and to add the formate thereto.

The treatment is conducted at a temperature of preferably from 0 to 150° C., more preferably from 5 to 120° C., for a period of preferably from 0.5 to 100 hours, more preferably from 1 to 40 hours.

A general procedure for purifying the polymer of the invention with a formate comprises causing the formate to act on an aromatic compound solution of the polymer and then removing the resultant metal impurity precipitate by filtration. However, usable purification techniques are not limited thereto.

For example, use may be made of a method which comprises causing a formate to act on the polymer of the invention and then removing the metal impurities by subjecting the resultant mixture to a treatment with an adsorbent such as an ion-exchange resin or activated carbon. Alternatively, a method may be used in which a formate is added to an aromatic compound solution of the polymer at room temperature and the resultant mixture is immediately extracted with water.

Other techniques usable in the case where the polymer is solid include: a method comprising packing the polymer into a column and passing a formate solution through the column to clean the polymer; and a method in which the polymer is extracted with an acid and a formate solution using a Soxhlet extractor.

A method is also effective in which the polymer is purified by reprecipitation from a poor solvent for the polymer, e.g., an alcohol solvent such as methanol or ethanol or an alkane solvent such as hexane or cyclohexane.

It is a matter of course that more preferred results are obtained by repeating the operations such as the filtration, cleaning, and reprecipitation described above one or more times as long as external pollution is avoided. Furthermore, after metal impurities have been removed by a technique such as the filtration, cleaning, or reprecipitation described above, the operation for metal impurity removal with a formate may be conducted again. This is also effective.

By the purification with a formate described above, transition metals such as iron, cobalt, nickel, ruthenium, palladium, osmium, iridium, and platinum can be -advantageously removed from the polymer.

The mechanism of the removal of metal ions with a formate has not been elucidated. However, it is thought that since formic acid has a hydrogen atom bonded to the carbonyl carbon and hence has a reducing ability, it changes the valences of metal ions and thereby brings the metal impurities into a readily removable state. It is further thought that since the formate has an affinity for the polymer because they both are organic substances, even the ions which have come into inner parts of the polymer can be effectively removed.

Composition for Film Formation

The composition for film formation of the invention is prepared by dissolving the polymer of the invention (hereinafter referred to as "polymer (1)") in a solvent.

The solvent to be used here may be at least one member selected from the group consisting of alcohol solvents, ketone solvents, amide solvents, ester solvents, and aprotic solvents.

Examples of the alcohol solvents include monohydric alcohols such as methanol, ethanol, n-propanol, isopropanol, n-butanol, isobutanol, sec-butanol, t-butanol, n-pentanol, isopentanol, 2-methylbutanol, sec-pentanol, t-pentanol, 3-methoxybutanol, n-hexanol, 2-methylpentanol, sec-hexanol, 2-ethylbutanol, sec-heptanol, heptanol-3, n-octanol, 2-ethylhexanol, sec-octanol, n-nonyl alcohol, 2,6-dimethylheptanol-4, n-decanol, sec-undecyl alcohol, trimethylnonyl alcohol, sec-tetradecyl alcohol, sec-heptadecyl alcohol, phenol, cyclohexanol, methylcyclohexanol, 3,3,5-trimethylcyclohexanol, benzyl alcohol, and diacetone alcohol;

polyhydric alcohols such as ethylene glycol, 1,2-propylene glycol, 1,3-butylene glycol, pentanediol-2,4, 2-methylpentanediol-2,4, hexanediol-2,5, heptanediol-2,4, 2-ethylhexanediol-1,3, diethylene glycol, dipropylene glycol, triethylene glycol, and tripropylene glycol; and partial ethers of polyhydric alcohols, such as ethylene glycol monomethyl ether, ethylene glycol monoethyl ether, ethylene glycol monopropyl ether, ethylene glycol monobutyl ether, ethylene glycol monohexyl ether, ethylene glycol monophenyl ether, ethylene glycol mono-2-ethylbutyl ether, diethylene glycol monomethyl ether, diethylene glycol monoethyl ether, diethylene glycol monopropyl ether, diethylene glycol monobutyl ether, diethylene glycol monohexyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, and dipropylene glycol monopropyl ether. These alcohol solvents may be used alone or in combination of two or more thereof.

Examples of the ketone solvents include acetone, methyl ethyl ketone, methyl n-propyl ketone, methyl n-butyl ketone, diethyl ketone, methyl isobutyl ketone, methyl n-pentyl ketone, ethyl n-butyl ketone, methyl n-hexyl ketone, diisobutyl ketone, trimethylnonanone, cyclohexanone, 2-hexanone, methylcyclohexanone, 2,4-pentanedione, acetonylacetone, acetophenone, and fenchone. Examples thereof further include β-diketones such as acetylacetone, 2,4-hexanedione, 2,4-heptanedione, 3,5-heptanedione, 2,4-octanedione, 3,5-octanedione, 2,4-nonanedione, 3,5-nonanedione, 5-methyl-2,4-hexanedione, 2,2,6,6-tetramethyl-3,5-heptanedione, and 1,1,1,5,5,5-hexafluoro-2,4-heptanedione. These ketone solvents may be used alone or in combination of two or more thereof.

Examples of the amide solvents include formamide, N-methylformamide, N,N-dimethylformamide, N-ethylformamide, N,N-diethylformamide, acetamide, N-methylacetamide, N,N-dimethylacetamide, N-ethylacetamide, N,N-diethylacetamide, N-methylpropionamide, N-methylpyrrolidone, N-formylmorpholine, N-formylpiperidine, N-formylpyrrolidine, N-acetylmorpholine, N-acetylpiperidine, and N-acetylpyrrolidine. These amide solvents may be used alone or in combination of two or more thereof.

Examples of the ester solvents include diethyl carbonate, ethylene carbonate, propylene carbonate, methyl acetate, ethyl acetate, γ-butyrolactone, γ-valerolactone, n-propyl acetate, isopropyl acetate, n-butyl acetate, isobutyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, isoamyl propionate, diethyl oxalate, di-n-butyl oxalate, methyl lactate, ethyl lactate, n-butyl lactate, n-amyl lactate, diethyl malonate, dimethyl phthalate, and diethyl phthalate. These ester solvents may be used alone or in combination of two or more thereof.

Examples of the aprotic solvents include acetonitrile, dimethyl sulfoxide, N,N,N',N'-tetraethylsulfamide, hexamethylphosphoric triamide, N-methylmorpholone, N-methylpyrrole, N-ethylpyrrole, N-methyl-Δ³-pyrroline, N-methylpiperidine, N-ethylpiperidine, N,N-dimethylpiperazine, N-methylimidazole, N-methyl-4-piperidone, N-methyl-2-piperidone, N-methyl-2-pyrrolidone, 1,3-dimethyl-2-imidazolidinone, and 1,3-dimethyltetrahydro-2(1H)-pyrimidinone. These aprotic solvents may be used alone or in combination of two or more thereof.

Ingredients such as colloidal silica, colloidal alumina, organic polymers other than polymer (1), surfactants, silane coupling agents, triazene compounds, radical generators, compounds having one or more polymerizable double bonds, and compounds having one or more polymerizable triple bonds may be added to the composition for film formation of the invention.

The colloidal silica is a dispersion comprising, for example, any of the aforementioned hydrophilic organic solvents and high-purity silicic acid anhydride dispersed therein. It has an average particle diameter of generally from 5 to 30 nm, preferably from 10 to 20 nm, and a solid concentration of generally about from 10 to 40% by weight. Examples of the colloidal silica include the methanol silica sol and isopropanol silica sol manufactured by Nissan Chemical Industries, Ltd. and Oscal, manufactured by Catalysts & Chemicals Industries Co., Ltd. The amount of such colloidal silica to be used is generally preferably from 1 to 20 parts by weight per 100 parts by weight of polymer (1).

Examples of the colloidal alumina include Alumina Sol 520, 100, and 200, manufactured by Nissan Chemical Industries, Ltd., and Alumina Clear Sol and Alumina Sol 10 and 132, manufactured by Kawaken Fine Chemicals Co., Ltd. The amount of such colloidal alumina to be used is generally preferably from 1 to 20 parts by weight per 100 parts by weight of polymer (1).

Examples of the organic polymers include polymers having a sugar chain structure, vinyl amide polymers, (meth)acrylic polymers, polymers of aromatic vinyl compounds, dendrimers, polyimides, poly(amic acid)s, polyamides, polyquinoxaline, polyoxadiazole, fluoropolymers, and polymers having a poly(alkylene oxide) structure.

Examples of the polymers having a poly(alkylene oxide) structure include polymers having a poly(methylene oxide) structure, poly(ethylene oxide) structure, poly(propylene oxide) structure, poly(tetramethylene oxide) structure, poly(butylene oxide) structure, or the like.

Specific examples thereof include ether type compounds such as polyoxymethylene alkyl ethers, polyoxyethylene alkyl ethers, polyoxyethylene alkylphenyl ethers, polyoxyethylene sterol ethers, polyoxyethylene lanolin derivatives, ethylene oxide derivatives of alkylphenol formalin condensates, polyoxyethylene/polyoxypropylene block copolymers, and polyoxyethylene/polyoxypropylene alkyl ethers; ether-ester type compounds such as polyoxyethylene glycerol fatty acid esters, polyoxyethylene sorbitan fatty acid esters, polyoxyethylene sorbitol fatty acid esters, and polyoxyethylene fatty acid alkanolamide sulfuric acid salts; and ether-ester type compounds such as polyethylene glycol fatty acid esters, ethylene glycol fatty acid esters, fatty acid monoglycerides, polyglycerol fatty acid esters, sorbitan fatty acid esters, propylene glycol fatty acid esters, and sucrose fatty acid esters.

Examples of the polyoxyethylene/polyoxypropylene block copolymers include compounds having either of the following block structures:

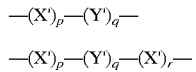

wherein X' represents —CH$_2$CH$_2$O—; Y' represents —CH$_2$CH(CH$_3$)O—; p is a number of 1 to 90; q is a number of 10 to 99; and r is a number of 0 to 90.

Of those, more preferred compounds are ether type compounds such as polyoxyethylene alkyl ethers, polyoxyethylene/polyoxypropylene block copolymers, polyoxyethylene/polyoxypropylene alkyl ethers, polyoxyethylene glycerol fatty acid esters, polyoxyethylene sorbitan fatty acid esters, and polyoxyethylene sorbitol fatty acid esters. These compounds may be used alone or in combination of two or more thereof. The amount of such a polymer to be used is generally preferably from 1 to 30 parts by weight per 100 parts by weight of polymer (1).

Examples of the surfactants include nonionic surfactants, anionic surfactants, cationic surfactants, and amphoteric surfactants, and further include fluorochemical surfactants, silicone surfactants, poly(alkylene oxide) surfactants, and poly(meth)acrylate surfactants. Preferred of these are fluorochemical surfactants and silicone surfactants.

The fluorochemical surfactants are ones comprising a compound having a fluoroalkyl or fluoroalkylene group in at least one position selected from the ends, main chain, and side chains. Examples thereof include 1,1,2,2-tetrafluorooctyl 1,1,2,2-tetrafluoropropyl ether, 1,1,2,2-tetrafluorooctyl hexyl ether, octaethylene glycol di(1,1,2,2-tetrafluorobutyl) ether, hexaethylene glycol 1,1,2,2,3,3-hexafluoropentyl ether, octapropylene glycol di(1,1,2,2-tetrafluorobutyl) ether, hexapropylene glycol di(1,1,2,2,3,3-hexafluoropentyl) ether, sodium perfluorododecylsulfonate, 1,1,2,2,8,8,9,9,10,10-decafluorododecane, 1,1,2,2,3,3-hexafluorodecane, N-[3-perfluorooctanesulfonamido)propyl]-N,N'-dimethyl-N-carboxymethyleneammonium betaine, perfluoroalkylsulfonamidopropyltrimethylammonium salts, perfluoroalkyl-N-ethylsulfonyl glycine salts, bis(N-perfluorooctylsulfonyl-N-ethylaminoethyl) phosphate, and monoperfluoroalkylethyl phosphates.

Commercially available products of such fluorochemical surfactants include products available under the trade names of Megafac F142D, F172, F173, and F183 (manufactured by Dainippon Ink & Chemicals, Inc.); F-Top EF301, EF303, and EF352 (manufactured by New Akita Chemical Company); Fluorad FC-430 and FC-431 (manufactured by Sumitomo 3M Ltd.); Asahi Guard AG710 and Surflon S-382, SC-101, SC-102, SC-103, SC-104, SC-105, and SC-106 (manufactured by Asahi Glass Co., Ltd.); BM-1000 and BM-1100 (manufactured by Yusho K.K.); and NBX-15 (manufactured by NEOS Co., Ltd.). Especially preferred of these are Megafac F172, BM-1000, BM-1100, and NBX-15.

Examples of the silicone surfactants include SH7PA, SH21PA, SH30PA, and ST94PA (all manufactured by Dow Corning Toray Silicone Co., Ltd.). Of these, SH28PA and SH30PA are especially preferred.

The amount of such a surfactant to be used is generally from 0.00001 to 1 part by weight per 100 parts by weight of polymer (1). Those surfactants may be used alone or in combination of two or more thereof.

Examples of the silane coupling agents include 3-glycidyloxypropyltrimethoxysilane, 3-aminoglycidyloxypropyltriethoxysilane, 3-methacryloxypropyltrimethoxysilane, 3-glycidyloxypropylmethyldimethoxysilane, 1-methacryloxypropylmethyldimethoxysilane, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-triethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, vinyltrimethoxysilane, vinyltriethoxysilane, vinyltripropoxysilane, vinyltributoxysilane, p-tolyltrimethoxysilane, p-tolyltriethoxysilane, m-ethynylphenyltrimethoxysilane, p-ethynylphenyltrimethoxysilane, m-ethynylphenyltriethoxysilane, and p-ethynylphenyltriethoxysilane. Also usable are hydrolyzates and/or condensates of these alkoxysilanes.

Those silane coupling agents may be used alone or in combination of two or more thereof. The amount of such a silane coupling agent to be used is generally preferably from 0.1 to 10 parts by weight per 100 parts by weight of polymer (1).

Examples of the triazene compounds include 1,2-bis(3,3-dimethyltriazenyl)benzene, 1,3-bis(3,3-dimethyltriazenyl)benzene, 1,4-bis(3,3-dimethyltriazenyl)benzene, bis(3,3-dimethyltriazenylphenyl) ether, bis(3,3-dimethyltriazenylphenyl)methane, bis(3,3-dimethyltriazenylphenyl) sulfone, bis(3,3-dimethyltriazenylphenyl) sulfide, 2,2-bis[4-(3,3-dimethyltriazenylphenoxy)phenyl]-1,1,1,3,3,3-hexafluoropropane, 2,2-bis[4-(3,3-dimethyltriazenylphenoxy)phenyl]propane, 1,3,5-tris(3,3-dimethyltriazenyl)benzene, 2,7-bis(3,3-dimethyltriazenyl)-9,9-bis[4-(3,3-dimethyltriazenyl)phenyl]fluorene, 2,7-bis(3,3-dimethyltriazenyl)-9,9-bis[3-methyl-4-(3,3-dimethyltriazenyl)phenyl]fluorene, 2,7-bis(3,3-dimethyltriazenyl)-9,9-bis[3-phenyl-4-(3,3-dimethyltriazenyl)phenyl]fluorene, 2,7-bis(3,3-dimethyltriazenyl)-9,9-bis[3-propenyl-4-(3,3-dimethyltriazenyl)phenyl]fluorene, 2,7-bis(3,3-dimethyltriazenyl)-9,9-bis[3-fluoro-4-(3,3-dimethyltriazenyl)phenyl]fluorene, 2,7-bis(3,3-dimethyltriazenyl)-9,9-bis[3,5-difluoro-4-(3,3-dimethyltriazenyl)phenyl]fluorene, and 2,7-bis(3,3-dimethyltriazenyl)-9,9-bis[3-trifluoromethyl-4-(3,3-dimethyltriazenyl)phenyl]fluorene.

Those triazene compounds may be used alone or in combination of two or more thereof. The amount of such a triazene compound to be used is generally preferably from 1 to 10 parts by weight per 100 parts by weight of polymer (1).

Examples of the radical generators include organic peroxides such as isobutyryl peroxide, α,α'-bis(neodecanoylperoxy)diisopropylbenzene, cumyl peroxyneodecanoate, di-n-propyl peroxydicarbonate, diisopropyl peroxydicarbonate, 1,1,3,3-tetramethylbutyl peroxyneodecanoate, bis(4-t-butylcyclohexyl) peroxydicarbonate, 1-cyclohexyl-1-methylethyl peroxyneodecanoate, di-2-ethoxyethyl peroxydicarbonate, di-2-ethylhexyl peroxydicarbonate, t-hexyl peroxyneodecanoate, dimethoxybutyl peroxydicarbonate, di(3-methyl-3-methoxybutyl) peroxydicarbonate, t-butyl peroxyneodecanoate, 2,4-dichlorobenzoyl peroxide, t-hexyl peroxypivalate, t-butyl peroxypivalate, 3,5,5-trimethylhexanoyl peroxide, octanoyl peroxide, lauroyl peroxide, stearoyl peroxide, 1,1,3,3-tetramethylbutyl peroxy-2-ethylhexanoate, succinic peroxide, 2,5-dimethyl- 2,5-di(2-ethylhexanoylperoxy)hexane, 1-cyclohexyl-1-methylethyl peroxy-2-ethylhexanoate, t-hexyl peroxy-2-ethylhexanoate, t-butyl peroxy-2-ethylhexanoate, m-toluoyl benzoyl peroxide, benzoyl peroxide, t-butyl peroxyisobutyrate, di-t-butylperoxy-2-methylcyclohexane, 1,1-bis(t-hexylperoxy)-3,3,5-trimethylcyclohexane, 1,1-bis (t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-t-butylperoxycyclohexyl)propane, 1,1-bis(t-butylperoxy)cyclodecane, t-hexyl peroxyisopropylmonocarbonate, t-butyl peroxymaleate, t-butyl peroxy-3,3,5-trimethylhexanoate, t-butyl peroxylaurate, 2,5-dimethyl-2,5-di(m-toluoylperoxy) hexane, t-butyl peroxyisopropylmonocarbonate, t-butyl peroxy-2-ethylhexylmonocarbonate, t-hexyl peroxybenzoate, 2,5-dimethyl-2,5-di(benzoylperoxy) hexane, t-butyl peroxyacetate, 2,2-bis(t-butylperoxy)butane, t-butyl peroxybenzoate, n-butyl 4,4-bis(t-butylperoxy) valerate, di-t-butyl peroxyisophthalate, $\alpha,\alpha'$-bis(t-butylperoxy)diisopropylbenzene, dicumyl peroxide, 2,5-dimethyl-2,5-di(t-butylperoxy)hexane, t-butylcumyl peroxide, di-t-butyl peroxide, p-menthane hydroperoxide, 2,5-dimethyl-2,5-di(t-butylperoxy)hexyne-3, diisopropylbenzene hydroperoxide, t-butyl trimethylsilyl peroxide, 1,1,3,3-tetramethylbutyl hydroperoxide, cumene hydroperoxide, t-hexyl hydroperoxide, and t-butyl hydroperoxide; and bibenzyl compounds such as dibenzyl, 2,3-dimethyl-2,3-diphenylbutane, $\alpha,\alpha'$-dimethoxy-$\alpha,\alpha'$-diphenylbibenzyl, $\alpha,\alpha'$-diphenyl-$\alpha$-methoxybibenzyl, $\alpha,\alpha'$-diphenyl-$\alpha,\alpha'$-dimethoxybibenzyl, $\alpha,\alpha'$-dimethoxy-$\alpha,\alpha'$-dimethylbibenzyl, $\alpha,\alpha'$-dimethoxybibenzyl, 3,4-dimethyl-3,4-diphenyl-n-hexane, and 2,2,3,3-tetraphenylsuccinonitrile.

Those radical generators may be used alone or in combination of two or more thereof. The amount of such a radical generator to be used is generally preferably from 0.5 to 10 parts by weight per 100 parts by weight of polymer (1).

Examples of the compounds having one or more polymerizable double bonds include allyl compounds such as allylbenzene, diallylbenzene, triallylbenzene, allyloxybenzene, diallyloxybenzene, triallyloxybenzene, $\alpha,\omega$-diallyloxyalkanes, $\alpha,\omega$-diallylalkenes, $\alpha,\omega$-diallylalkynes, allylamine, diallylamine, triallylamine, N-allylphthalimide, N-allylpyromellitimide, N,N'-diallylurea, triallyl isocyanurate, and 2,2'-diallylbisphenol A;
vinyl compounds such as styrene, divinylbenzene, trivinylbenzene, stilbene, propenylbenzene, dipropenylbenzene, tripropenylbenzene, phenyl vinyl ketone, methyl styryl ketone, $\alpha,\omega$-divinylalkanes, $\alpha,\omega$-divinylalkenes, $\alpha,\omega$-divinylalkynes, $\alpha,\omega$-divinyloxyalkanes, $\alpha,\omega$-divinyloxyalkenes, $\alpha,\omega$-divinyloxyalkynes, $\alpha,\omega$-diacryloyloxyalkanes, $\alpha,\omega$-diacryloylalkenes, $\alpha,\omega$-diacryloylalkynes, $\alpha,\omega$-dimethacryloyloxyalkanes, $\alpha,\omega$-dimethacryloylalkenes, $\alpha,\omega$-dimethacryloylalkynes, bisacryloyloxybenzene, trisacryloyloxybenzene, bismethacryloyloxybenzene, trismethacryloyloxybenzene, N-vinylphtbalimide, and N-vinylpyromellitimide; and
poly(arylene ether)s containing 2,2'-diallyl-4,4'-biphenol and polyarylenes containing 2,2'-diallyl-4,4'-biphenol.

Those compounds having one or more polymerizable double bonds may be used alone or in combination of two or more thereof. The amount of such a compound to be used is generally preferably from 0.5 to 10 parts by weight per 100 parts by weight of polymer (1).

Examples of the compounds having one or more polymerizable triple bonds include compounds represented by general formulae (3) and (4). Other examples of the compounds having one or more polymerizable triple bonds include ethynylbenzene, bis(trimethylsilylethynyl)benzene, tris(trimethylsilylethynyl)benzene, triethynylbenzene, bis (trimethylsilylethynylphenyl)ether, and trimethylsilylethynylbenzene.

Those compounds having one or more polymerizable triple bonds may be used alone or in combination of two or more thereof. The amount of such a compound to be used is generally preferably from 1 to 20 parts by weight per 100 parts by weight of polymer (1).

The composition for film formation of the invention has a total solid concentration of preferably from 1 to 30% by weight, more preferably from 2 to 20% by weight. The total solid concentration thereof is suitably regulated according to the intended use thereof. When the composition has a total solid concentration of from 1 to 30% by weight, the composition has excellent storage stability and can give a coating film having a thickness in an appropriate range.

For applying the composition of the invention to a substrate such as a silicon wafer, $SiO_2$ wafer, or SiN wafer, a coating technique such as spin coating, dip coating, roll coating, or spraying may be used. Thereafter, the composition applied is dried at ordinary temperature or is dried and cured by heating at a temperature of about from 80 to 600° C. for generally about from 5 to 240 minutes. Thus, a coating film (e.g., interlayer insulating film) can be formed. In this operation, heating can be conducted with a hot plate, oven, furnace, or the like, for example, in the air, in a nitrogen or argon atmosphere, under vacuum, or under reduced pressure having a controlled oxygen concentration. Irradiation with electron beams or ultraviolet also can be used for forming a coating film. This coating operation can be conducted so as to form a coating film having a thickness (on a solid basis) of about from 0.005 to 1.5 $\mu$m in the case of single coating or about from 0.01 to 3 $\mu$m in the case of double coating.

The composition for film formation of the invention can give a coating film through short-time curing. This coating film is excellent in heat resistance, adhesion, and cracking resistance and has a low dielectric constant. Consequently, the composition of the invention is useful in applications such as interlayer insulating films for semiconductor devices such as LSIs, system LSIs (large scale integrated circuits), DRAMs (dynamic random access memories), SDRAMs, RDRAMs, and D-RDRAMs, etching stoppers or stoppers for chemical mechanical polishing, protective films such as surface coat films for semiconductor devices, interlayers for use in semiconductor production processes employing a multilayered resist, interlayer insulating films for multilayered circuit boards, and protective or insulating films for liquid-crystal display devices.

EXAMPLES

The invention will be explained below in more detail by reference to the following Examples, but the invention should not be construed as being limited to these Examples.

In the following Examples and Comparative Examples, all "parts" and "percents" are by weight unless otherwise indicated.

The compositions for film formation in the Examples were evaluated for various properties by the following methods.

Weight-Average Molecular Weight (Mw)

Measured by gel permeation chromatography (GPC) under the following conditions.

Sample: One gram of a polymer was dissolved in 100 cc of tetrahydrofuran as a solvent to prepare a sample solution.

Standard polystyrene: Standard polystyrene manufactured by Pressure Chemical, U.S.A. was used.

Apparatus: A high-performance gel permeation chromatograph for high-temperature use (Model 150-C ALC/GPC) manufactured by Waters Inc., U.S.A.

Column: SHODEX A-80M (length, 50 cm), manufactured by Showa Denko K.K.

Measuring temperature: 40° C.

Flow rate: 1 cc/min

Dielectric Constant

A composition for film formation was applied to an 8-inch silicon wafer by spin coating. The wafer coated was baked on a hot plate at 80° C. for 2 minutes and subsequently at 180° C. for 2 minutes and then cured on a 390° C. hot plate in a nitrogen atmosphere for 10 minutes to form a coating film on the wafer. Aluminum was vapor-deposited on this coating film to produce a sample for dielectric constant evaluation. This sample was examined with electrodes HP16451B and precision LCR meter HP4284A, both manufactured by Yokogawa-Hewlett-Packard, Ltd., and the dielectric constant thereof was calculated from the capacitance value obtained at 10 kHz.

Cracking Resistance

A composition for film formation was applied to an 8-inch silicon wafer by spin coating. The wafer coated was dried on a hot plate at 80° C. for 2 minutes and subsequently at 180° C. for 2 minutes and then cured on a 390° C. hot plate in a nitrogen atmosphere for 10 minutes to form a coating film on the wafer. This coating operation was conducted so as to result in a final coating film thickness of 5 $\mu$m. The coated wafer obtained was immersed in pure water for 2 hours, and the appearance of the coating film was examined with a 350,000-lx lamp for surface examination to evaluate cracking resistance.

Adhesion of Coating Film

A composition for film formation was applied by spin coating to an 8-inch silicon wafer having a 1,000 Å-thick SiO film and 1,000 Å-thick SiN film superposed thereon in this order. The wafer coated was baked on a hot plate at 80° C. for 2 minutes and subsequently at 180° C. for 2 minutes and then cured on a 390° C. hot plate in a nitrogen atmosphere for 10 minutes to form a coating film on the wafer. The coating film obtained was subjected to a PCT (pressure cooker test) for 24 hours under the conditions of a temperature of 100° C., a humidity of 100% RH, and a pressure of 2 atm. Furthermore, ten stud pins were fixed to this wafer with an epoxy resin, and the epoxy resin applied was cured at 150° C. for 1 hour. Thereafter, the stud pins were pulled out by the Sebastian method to evaluate the adhesion of the coating film.

Glass Transition Temperature (Tg)

A composition for film formation was applied to an 8-inch silicon wafer by spin coating. The wafer coated was baked on a hot plate at 80° C. for 2 minutes and subsequently at 180° C. for 2 minutes and then cured on a 390° C. hot plate in a nitrogen atmosphere for 10 minutes to form a coating film on the wafer. The coating film was peeled from the wafer and examined by DSC (differential scanning calorimetry) up to 500° C. in a nitrogen atmosphere at a heating rate of 10° C./min.

Example 1

120 ml of tetrahydrofuran, 3.46 g of tetrakistriphenylphosphinepalladium, 2.1 g of dichlorobistriphenylphosphinepalladium, 1.44 g of copper iodide, 20 mL of piperidine and 185.72 g of 4,4'-bis(2-iodophenoxy)benzophenone were introduced into a 1,000 ml three-necked flask equipped with a thermometer, argon gas introduction tube and stirrer. 65.48 g of 4,4'-diethynyldiphenyl ether was then added to the flask and the resulting mixture was reacted at 25° C. for 20 hours. This reaction mixture was repeatedly subjected twice to reprecipitation with 5 liters of acetic acid. The solid recovered was dissolved in cyclohexanone, and this solution was washed twice with ultrapure water and then subjected to reprecipitation with 5 liters of methanol. The precipitate was taken out by filtration and dried to obtain a polymer A having a weight-average molecular weight of 35,000.

3 g of the polymer A was dissolved in 27 g of cyclohexanone. This solution was filtered through a filter made of Teflon having an opening diameter of 0.2 $\mu$m to obtain a composition for film formation.

The composition obtained was applied to a silicon wafer by spin coating. The wafer coated was baked on a hot plate at 80° C. for 2 minutes and at 180° C. for 2 minutes, and then cured on a 390° C. hot plate in a nitrogen atmosphere for 10 minutes. Thus, a coating film was formed.

The coating film obtained had a dielectric constant as low as 2.92. $T_g$ was not observed in the material constituting the coating film. This coating film was evaluated for cracking resistance and, as a result, cracks were not observed even after immersion in pure water. Furthermore, as a result of the evaluation of coating film adhesion, peeling did not occur at the interface between the wafer and the coating film with respect to each of the ten stud pins.

Example 2

Figure 2:
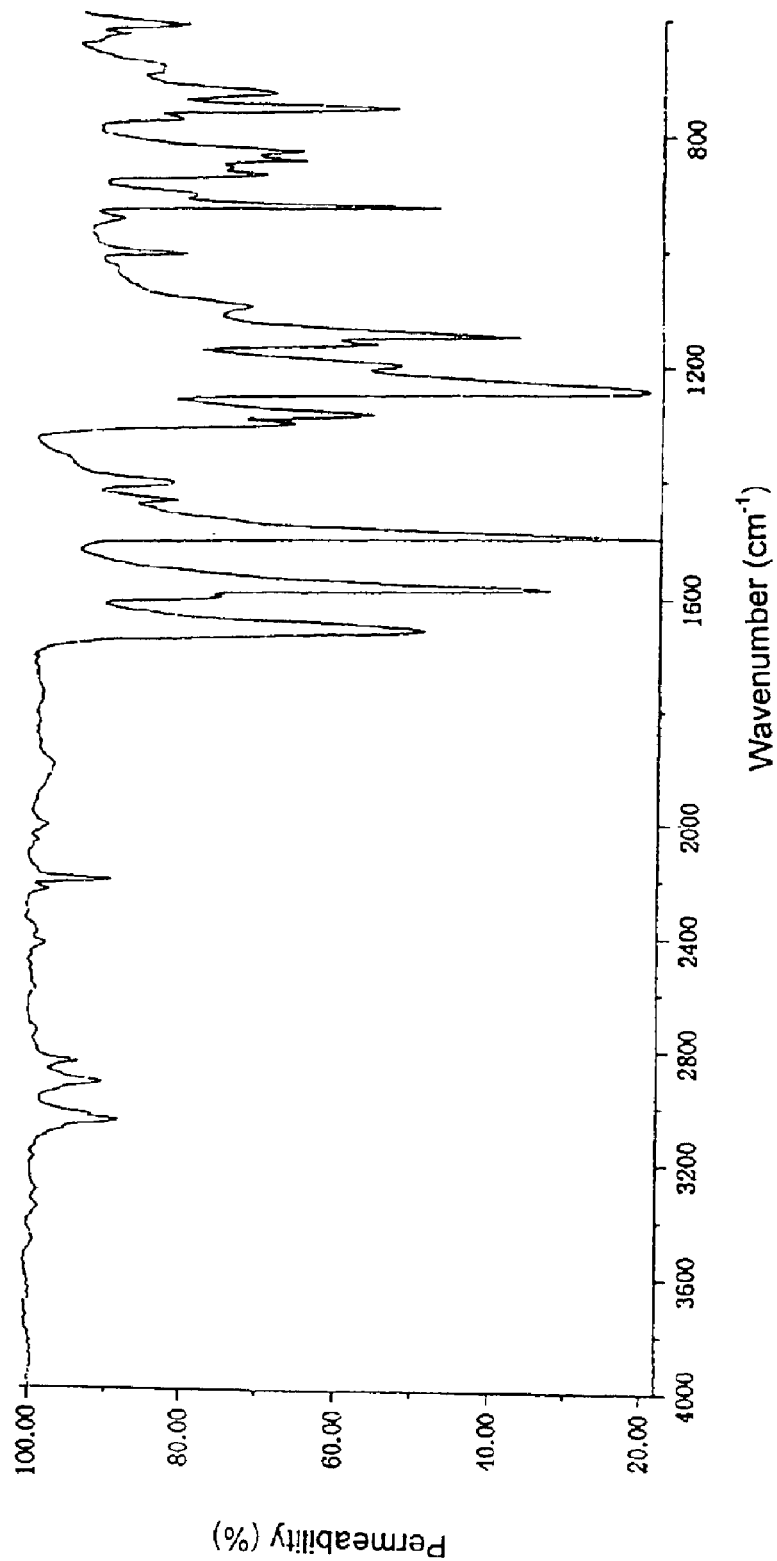
FIG. 2 is a presentation showing an IR spectrum of the polymer obtained in Example 2.

The same procedure as in Example 1 was conducted, except that 189.06 g of 4,4'-(2-iodobenzoyl)diphenyl ether was used in place of the 4,4'-bis(2-iodophenoxy)benzophenone. Thus, a polymer B having a weight-average molecular weight of 38,000 was obtained. A $^1$H-NMR spectrum and IR spectrum of this polymer B are shown in FIGS. 1 and 2, respectively.

3 g of the polymer B was dissolved in 27 g of cyclohexanone. This solution was filtered through a filter made of Teflon having an opening diameter of 0.2 $\mu$m to obtain a composition for film formation.

The composition obtained was applied to a silicon wafer by spin coating. The wafer coated was dried on a hot plate at 80° C. for 2 minutes and at 180° C. for 2 minutes, and then cured on a 390° C. hot plate in a nitrogen atmosphere for 10 minutes. Thus, a coating film was formed.

The coating film obtained had a dielectric constant as low as 2.98. $T_g$ was not observed in the material constituting the coating film. This coating film was evaluated for cracking resistance and, as a result, cracks were not observed even after immersion in pure water. Furthermore, as a result of the evaluation of coating film adhesion, peeling did not occur at the interface between the wafer and the coating film with respect to each of the ten stud pins.

Example 3

3.2 g of the polymer A obtained in Example 1 was dissolved in 97 g of cyclohexanone. 20 g of triethylamine and 10 g of 99% formic acid were added to this solution. The resulting mixture was heated at 100° C. for 9 hours, cooled to room temperature, and then filtered through a membrane filter having an opening size of 0.2 $\mu$m to remove the black solid precipitated. Thus, a light-brown transparent varnish was obtained. This varnish was washed with 100 cc of distilled water three times and then poured into 500 cc of methanol to reprecipitate the polymer A. The precipitate obtained was taken out by filtration and vacuum-dried at 50°

C. to obtain 3.0 g of a purified polymer A, which was light yellow. This purified polymer A was examined by GPC and was found to have a weight-average molecular weight of 36,000. The purified polymer A was thus ascertained to have almost the same weight-average molecular weight as the unpurified polymer. It was further ascertained from the results of IR and $^1$H-NMR spectroscopy that the polymer had undergone no change in chemical structure through the purification. Furthermore, 3 g of the purified polymer A was dissolved in 97 g of cyclohexanone and this solution was examined for metal content. As a result, the solution was found to contain copper and palladium in amounts of 5.0 ppb and 17 ppb, respectively.

Comparative Example 1

35.04 g of 9,9-bis(4-hydroxyphenyl)fluorene and 16.00 g of an aqueous sodium hydroxide solution were introduced into a flask together with dimethylacetamide. The resulting mixture was heated in a nitrogen atmosphere at 160° C. for 20 hours, during which the water vapor generated was removed from the system. 14.70 g of 4,4-bisfluorobenzophenone and 2.2 g of cuprous chloride were added to the resulting solution. This mixture was reacted at 160° C. for 8 hours, cooled, and then filtered to remove the insoluble matter contained in the solution. The filtrate was poured into methanol to conduct reprecipitation. This precipitate was sufficiently washed with ion-exchanged water and then dissolved in cyclohexanone. After the insoluble matter was removed, the cyclohexanone solution was poured into acetone to conduct reprecipitation. This precipitate was dried in a 60° C. vacuum oven for 24 hours to obtain a polymer C having a weight-average molecular weight of 24,000.

3 g of the polymer C was dissolved in 27 g of cyclohexanone. This solution was filtered through a filter made of Teflon having an opening diameter of 0.2 μm.

The composition obtained was applied to a silicon wafer by spin coating. The wafer coated was dried on a hot plate at 80° C. for 2 minutes and at 180° C. for 2 minutes, and then cured on a 390° C. hot plate in a nitrogen atmosphere for 10 minutes. Thus, a coating film was formed.

The coating film obtained had a dielectric constant as low as 2.87. However, the material constituting the coating film was found to have a $T_g$ of 250° C. As a result of the evaluation of coating film adhesion, interfacial peeling between the wafer and the coating film occurred with respect to eight stud pins.

Comparative Example 2

77.04 g of methyltrimethoxysilane and 2 g of acetic acid were dissolved in 290 g of isopropyl alcohol. This solution was stirred with a Three-One Motor to maintain the temperature thereof at 60° C. 84 g of ion-exchanged water was added to the solution over 1 hour, and the resulting mixture was reacted at 60° C. for 2 hours to obtain a reaction mixture (1) (condensate).

This reaction mixture was filtered through a filter made of Teflon having an opening diameter of 0.2 μm.

The composition obtained was applied to a silicon wafer by spin coating. The wafer coated was baked on a hot plate at 80° C. for 2 minutes and at 180° C. for 2 minutes, and then cured on a 390° C. hot plate in a nitrogen atmosphere for 10 minutes. Thus, a coating film was formed.

The coating film obtained had a dielectric constant as high as 3.44. Furthermore, this coating film was evaluated for cracking resistance. As a result, the 5 μm-thick coating film had cracked, showing that it had poor cracking resistance.

When a composition for film formation which contains the polymer of the invention is applied to a substrate (or base), a coating film is obtained through short-time curing. This coating film is excellent in heat resistance, adhesion, and cracking resistance and has a low dielectric constant. This coating film is hence useful, for example, as an interlayer insulating film in semiconductor devices. According to the process of the invention, this polymer can be easily produced.

What is claimed is:

1. A polymer having repeating units represented by the following formula (1):

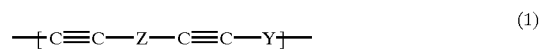

wherein Z is at least one bivalent aromatic group selected from the group consisting of bivalent aromatic groups represented by the following general formula (2):

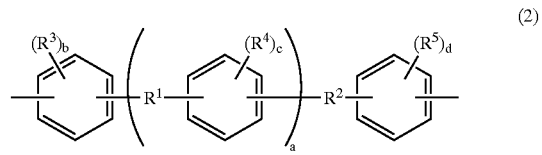

wherein $R^1$ and $R^2$ each independently represent a single bond, —O—, —CO—, —CH$_2$—, —COO—, —CONH—, —S—, —SO$_2$—, a phenylene group, a fluorenylene group, or a bivalent group represented by the formula

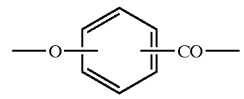

$R^3$, $R^4$, $R^5$, and each independently represent a hydrocarbon group having 1 to 20 carbon atoms, a cyano group, a nitro group, an alkoxyl group having 1 to 20 carbon atoms, or an aryl group; a is an integer of 1 to 3; and b, c d and each independently are an integer of 0 to 4 and Y is at least one bivalent aromatic group selected from the group consisting of bivalent aromatic groups represented by the following general formulae (4) and (5):

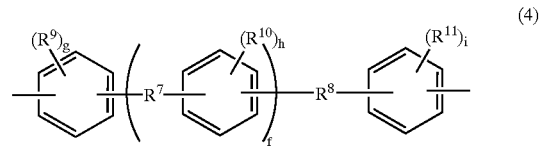

wherein $R^7$ and $R^8$ each independently represent a single bond, —O—, —CO—, —CH$_2$—, —COO—, —CONH—, —S—, —SO$_2$—, a phenylene group, or a fluorenylene group; $R^9$, $R^{10}$, $R^{11}$, and $R^{12}$ each independently represent a hydrocarbon group having 1 to 20 carbon atoms, a cyano group, a nitro group, an alkoxyl group having 1 to 20 carbon atoms, or an aryl group; f is an integer of 0 to 3; and g, h, i, and j each independently are an integer of 0 to 4.

2. The polymer as claimed in claim 1, which has —O— or —CO— in the polymer skeleton.

3. A process for producing the polymer as claimed in claim 1, which comprises:

polymerizing at least one compound formula (6):

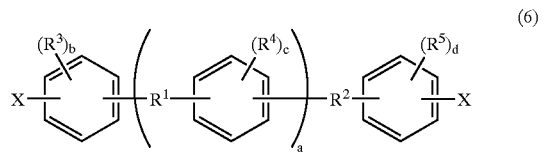

(6)

wherein $R^1$, $R^2$, $R^3$, $R^4$ and $R^5$, a, b, c and d are the same as defined in claim 1 with regard to general formula (1); and X represents a halogen atom, and at least one compound selected from the group consisting of compounds represented by the following formulae (8) and (9):

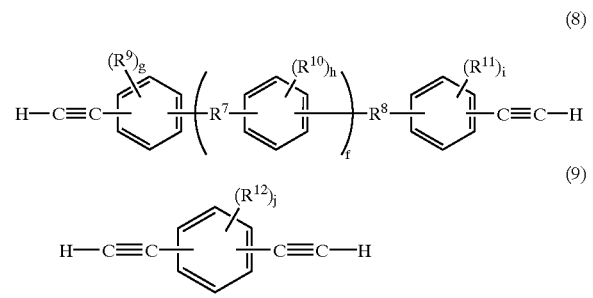

(8)

(9)

wherein $R^7$ and $R^8$ each independently represent a single bond, —O—, —CO—, —CH$_2$—, —COO—, —CONH—, —S—, —SO$_2$—, a phenylene group, or a fluorenylene group; $R^9$, $R^{10}$, $R^{11}$, and $R^{12}$ each independently represent a hydrocarbon group having 1 to 20 carbon atoms, a cyano group, a nitro group, an alkoxyl group having 1 to 20 carbon atoms, or an aryl group; f is an integer of 0 to 3; and g, h, i, and j each independently are an integer of 0 to 4, in the presence of a catalyst.

4. The process as claimed in claim 3, wherein the catalyst comprises a transition metal compound and a basic compound.

5. A composition for film formation which contains the polymer as claimed in claim 1.

6. A method of film formation, which comprises:

applying the composition for film formation as claimed in claim 5 to a substrate; and then curing the resulting coating.

7. An insulating film formed by the method of film formation as claimed in claim 6.

8. The process as claimed in claim 3, wherein the compound of formula (6) in the polymer is a compound selected from the group consisting of 1,2-bis(2-bromophenoxy)benzene, 1,2-bis(2-iodophenoxy)benzene, 1,2-bis(3-bromophenoxy)benzene, 1,2-bis(3-iodophenoxy)benzene, 1,2-bis(4-bromophenoxy)benzene, 1,2-bis(4-iodophenoxy)benzene, 1,3-bis(2-bromophenoxy)benzene, 1,3-bis(2-iodophenoxy)benzene, 1,3-bis(3-bromophenoxy)benzene, 1,3-bis(3-iodophenoxy)benzene, 1,3-bis(4-bromophenoxy)benzene, 1,3-bis(4-iodophenoxy)benzene, 1,4-bis(3-bromophenoxy)benzene, 1,4-bis(3-iodophenoxy)benzene, 1,4-bis(2-bromophenoxy)benzene, 1,4-bis(2-iodophenoxy)benzene, 1,4-bis(4-bromophenoxy)benzene, 1,4-bis(4-iodophenoxy)benzene, 1-(2-bromobenzoyl)-3-(2-bromophenoxy)benzene, 1-(2-iodobenzoyl)-3-(2-iodophenoxy)benzene, 1-(3-bromobenzoyl)-3-(3-bromophenoxy)benzene, 1-(3-iodobenzoyl)-3-(3-iodophenoxy)benzene, 1-(4-bromobenzoyl)-3-(4-bromophenoxy)benzene, 1-(4-iodobenzoyl)-3-(4-iodophenoxy)benzene, 1-(3-bromobenzoyl)-4-(3-bromophenoxy)benzene, 1-(3-iodobenzoyl)-4-(3-iodophenoxy)benzene, 1-(4-bromobenzoyl)-4-(4-bromophenoxy)benzene, 1-(4-iodobenzoyl)-4-(4-iodophenoxy)benzene, 2,2'-bis(2-bromophenoxy)benzophenone, 2,2'-bis(2-iodophenoxy)benzophenone, 2,4'-bis(2-bromophenoxy)benzophenone, 2,4'-bis(2-iodophenoxy)benzophenone, 4,4'-bis(2-bromophenoxy)benzophenone, 4,4'-bis(2-iodophenoxy)benzophenone, 2,2'-bis(3-bromophenoxy)benzophenone, 2,2'-bis(3-iodophenoxy)benzophenone, 2,4'-bis(3-bromophenoxy)benzophenone, 2,4'-bis(3-iodophenoxy)benzophenone, 4,4'-bis(3-bromophenoxy)benzophenone, 4,4'-bis(3-iodophenoxy)benzophenone, 2,2'-bis(4-bromophenoxy)benzophenone, 2,2'-bis(4-iodophenoxy)benzophenone, 2,4'-bis(4-bromophenoxy)benzophenone, 2,4'-bis(4-iodophenoxy)benzophenone, 4,4'-bis(4-bromophenoxy)benzophenone, 4,4'-bis(4-iodophenoxy)benzophenone, 2,2'-bis(2-bromobenzoyl)benzophenone, 2,2'-bis(2-iodobenzoyl)benzophenone, 2,4'-bis(2-2,4'-bis(2-iodobenzoyl)benzophenone, bromobenzoyl)benzophenone, 4,4'-bis(2-bromobenzoyl)benzophenone, 4,4'-bis(2-iodobenzoyl)benzophenone, 2,2'-bis(3-bromobenzoyl)benzophenone, 2,2'-bis(3-iodobenzoyl)benzophenone, 2,4'-bis(3-bromobenzoyl)benzophenone, 2,4'-bis(3-iodobenzoyl)benzophenone, 4,4'-bis(3-bromobenzoyl)benzophenone, 4,4'-bis(3-iodobenzoyl)benzophenone, 2,2'-bis(4-bromobenzoyl)benzophenone, 2,2'-bis(4-iodobenzoyl)benzophenone, 2,4'-bis(4-bromobenzoyl)benzophenone, 2,4'-bis(4-iodobenzoyl)benzophenone, 4,4'-bis(4-bromobenzoyl)benzophenone, 4,4'-bis(4-iodobenzoyl)benzophenone, 3,4'-bis(2-bromophenoxy)diphenyl ether, 3,4'-bis(2-iodophenoxy)diphenyl ether, 3,4'-bis(3-bromophenoxy)diphenyl ether, 3,4'-bis(3-iodophenoxy)diphenyl ether, 3,4'-bis(4-bromophenoxy)diphenyl ether, 3,4'-bis(4-iodophenoxy)diphenyl ether, 4,4'-bis(2-bromophenoxy)diphenyl ether, 4,4'-bis(2-iodophenoxy)diphenyl ether, 4,4'-bis(3-bromophenoxy)diphenyl ether, 4,4'-bis(3-iodophenoxy)diphenyl ether, 4,4'-bis(4-bromophenoxy)diphenyl ether, 4,4'-bis(4-iodophenoxy)diphenyl ether, 3,4'-bis(2-bromobenzoyl)diphenyl ether, 3,4'-bis(2-iodobenzoyl)diphenyl ether, 3,4'-bis(3-bromobenzoyl)diphenyl ether, 3,4'-bis(3-iodobenzoyl)diphenyl ether, 3,4'-bis(4-bromobenzoyl)diphenyl ether, 3,4'-bis(4-iodobenzoyl)diphenyl ether, 4,4'-bis(2-bromobenzoyl)diphenyl ether, 4,4'-bis(2-iodobenzoyl)diphenyl ether, 4,4'-bis(3-bromobenzoyl)diphenyl ether, 4,4'-bis(3-iodobenzoyl)diphenyl ether, 4,4'-bis(4-bromobenzoyl)diphenyl ether, and 4,4'-bis(4-iodobenzoyl)diphenyl ether.

9. The process as claimed in claim 3, wherein the compound of formula (8) in the polymer is a compound selected from the group consisting of 4,4'-diethynylbiphenyl, 3,3'-diethynylbiphenyl, 3,4'-diethynylbiphenyl, 4,4'-diethynyldiphenyl ether, 3,3'-diethynyldiphenyl ether, 3,4'-diethynyldiphenyl ether, 4,4'-diethynylbenzophenone, 3,3'-diethynylbenzophenone, 3,4'-diethynylbenzophenone, 4,4'-diethynyldiphenylmethane, 3,3'-diethynyldiphenylmethane, 3,4'-diethynyldiphenylmethane, phenyl 4,4'-diethynylbenzoate, phenyl 3,3'-diethynylbenzoate, phenyl 3,4'-diethylbenzoate, 4,4'-diethynylbenzanilide, 3,3'- diethynylbenzanilide, 3,4'-diethynylbenzanilide, 4,4'-diethynyldiphenyl sulfide, 3,3'-diethynyldiphenyl sulfide, 3,4'-diethynyldiphenyl sulfide, 4,4'-diethynyldiphenyl sulfone, 3,3'-diethynyldiphenyl sulfone, 3,4'-diethynyldiphenyl sulfone, 2,4,4'-triethynyldiphenyl ether, 9,9-bis(4-ethynylphenyl)fluorene, 4,4"-diethynyl-p-terphenyl, 4,4"-diethynyl-m-terphenyl, and 4,4"-diethynyl-o-terphenyl.

10. The process as claimed in claim 3, wherein the compound of formula (9) in the polymer is a compound selected from the group consisting of 1,2-diethynylbenzene, 1,3-diethynylbenzene, 1,4-diethynylbenzene, 2,5-diethynyltolune, and 3,4-diethynyltoluene.

11. The process as claimed in claim 3, wherein the compound of formula (6) and the compound(s) represented by formula (8) and/or formula (9) are reacted in a proportion that the total amount of the compound (8) and/or (9) ranges from 0.8 to 1.2 mol per mol of compound (6).

12. The process as claimed in claim 11, wherein the ratio of reacting compounds ranges from 0.9 to 1.1 mol per mol of compound (6).

13. The process as claimed in claim 3, wherein the catalyst is a combination of (a) a palladium salt or a palladium complex, (b) a of compound univalent copper and (c) a basic compound.

14. The process as claimed in claim 3, wherein the catalyst is a palladium complex selected from the group comprising of dichlorobis(triphenylphosphine)palladium, diiodobis(triphenylphosphine)palladium, dichlorobis(tri-o-tolylphosphine)palladium, dichlorobis(tricyanophenylphosphine)palladium, dichlorobis(tricyanomethylphosphine)palladium, dibromobis(tri-o-tolylphosphine)palladium, dibromobis(tricyanophenylphosphine)palladium, diiodobis(tri-o-tolylphosphine)palladium, dibromobis(tricyanomethylphosphine)palladium, diiodobis(tricyanophenylphosphine)palladium, diiodobis(tricyanomethylphosphine)palladium, tetrakis(triphenylphosphine)palladium, tetrakis(tri-o-tolylphosphine)palladium, tetrakis(tricyanophenylphosphine)palladium and tetrakis(tricyanomethylphosphine)palladium.

15. The process as claimed in claim 4, wherein the basic compound is a member selected from the group consisting of pyridine, pyrrole, piperazine, pyrrolidine, piperidine, picoline, trimethylamine, triethylamine, monoetbanolamine, diethanolamine, dimethylmonoethanolamine, monomethyldiethanolamine, triethanolamine, diazabicyclooctane, diazabicyclohonane, diazabicycloundecene, tetramethylanunonium hydroxide, diethylamine, ammonia, n-butylamine and imidazole.

16. The process as claimed in claim 13, wherein the proportion of the palladium salt or the palladium complex in the catalyst ranges from 0.0001 to 10 mol per mol of the total of reacting compounds of formulas (6), (8) and (9).

17. The process as claimed in claim 13, wherein the proportion of the univalent copper compound in the catalyst ranges from 0.000 to 10 mol per mol of the total of reacting compounds of formulas (6), (8) and (9).

18. The process as claimed in claim 13, wherein the proportion of the basic compound in the catalyst ranges from 1 to 1,000 mol per mol of the total of reacting compounds of formulas (6), (8) and (9).

19. The process as claimed in claim 3, wherein the polymerization reaction is conducted at a temperature ranging from 0 to 150° C. for 0.5 to 100 hours.

* * * * *